United States Patent [19]

Oler

[11] 4,294,812
[45] Oct. 13, 1981

[54] RECOVERY OF AMMONIA FROM AQUEOUS STREAMS

[75] Inventor: Robert A. Oler, Wilmington, N.C.

[73] Assignee: General Electric Company, San Jose, Calif.

[21] Appl. No.: 73,316

[22] Filed: Sep. 7, 1979

Related U.S. Application Data

[63] Continuation of Ser. No. 909,674, May 25, 1978, abandoned.

[51] Int. Cl.$^3$ ............................................. C01C 1/02
[52] U.S. Cl. .................................................. 423/357
[58] Field of Search ............................... 423/356, 357

[56] References Cited
U.S. PATENT DOCUMENTS

| | | | |
|---|---|---|---|
| 3,278,423 | 10/1966 | Millar | 423/358 |
| 4,104,131 | 8/1978 | Didycz et al. | 423/357 |
| 4,111,759 | 9/1978 | Didycz et al. | 423/357 |

OTHER PUBLICATIONS

Olsen, "Unit Processes and Principles of Chemical Engineering", D. Van Nostrand Co., Inc. (1932), pp. 1-3.

Primary Examiner—O. R. Veritz
Assistant Examiner—Wayne A. Langel
Attorney, Agent, or Firm—Ivor J. James, Jr.; Raymond G. Simkins; Samuel E. Turner

[57] ABSTRACT

Fixed ammonia in an aqueous stream is converted to free ammonia in solution by mixing the stream with a lime slurry in a mixing zone. The resulting liquid mixture is heated by contact with steam-containing gas to a temperature of at least about 95° C. to form a heated liquid mixture containing free ammonia in solution and an ammonia-rich product vapor. A portion of the heated liquid mixture is withdrawn and is contacted with steam in a packed stripping zone to produce liquid waste and vapor containing free ammonia and steam. At least a portion of the vapor from the stripper is used as steam-containing gas for heating the liquid mixture. Ammonia is recovered from ammonia-rich product vapor withdrawn from the mixing zone.

21 Claims, 1 Drawing Figure

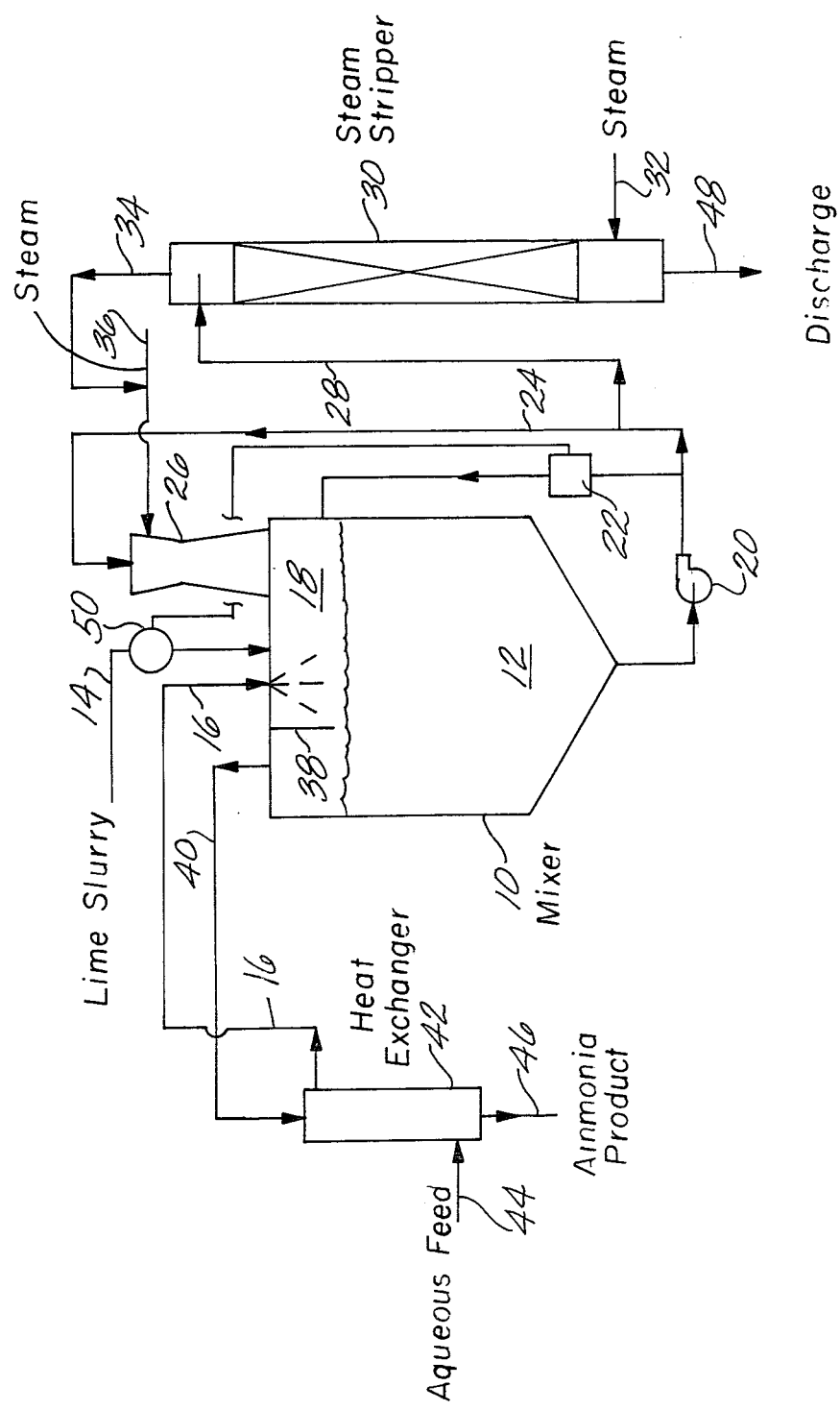

RECOVERY OF AMMONIA FROM AQUEOUS STREAMS

CROSS REFERENCE TO RELATED APPLICATION

This is a continuation of application Ser. No. 909,674, filed May 25, 1978, abandoned.

BACKGROUND

This invention relates to the recovery of fixed ammonia from an aqueous stream by treating the stream with lime and steam stripping the resulting free ammonia from the limed stream.

DESCRIPTION OF PRIOR ART

A number of industrial processes produce aqueous streams containing fixed ammonia that can be converted to free ammonia in solution by treating the aqueous stream with an alkali, typically a lime slurry. As the term is used herein, "fixed" ammonia is ammonia present as a dissolved ammonium salt such as ammonium fluoride, ammonium sulfate, or ammonium carbonate.

Fixed ammonia cannot be removed from the solution by distillation, for example, by steam stripping. It has been known to treat such solutions with an alkali, notably a slurry of lime (calcium hydroxide) to raise the pH of the solution. The calcium reacts with the anion, e.g., fluoride, sulfate, or carbonate, of the ammonium salt and converts the fixed ammonia to free ammonia in solution. "Free" ammonia is ammonia that can be removed from the solution by distillation, such as by steam stripping.

After treatment with lime, the solution is contacted with steam in a stripping zone or column. Free ammonia in the solution passes into the vapor phase and is removed from the stripping zone in admixture with steam. The remaining liquid, now stripped of free ammonia, is removed from the stripping zone as waste. The mixture of ammonia and steam is condensed to form an aqueous solution of ammonia or is otherwise treated for recovery of ammonia.

A problem encountered in practice of a process as outlined above is mineral scaling in the stripping zone or column. Such scaling can occur when the lime-treated aqueous mixture or slurry is introduced to the stripping zone at a relatively low temperature and is heated by the steam within the stripping zone. The aqueous mixture contains dissolved calcium compounds, and such compounds can form tightly adhering coatings or scale that foul internal surfaces of the stripping column.

This problem was recognized in U.S. Pat. No. 3,428,426 to Carney et al, which proposes as a solution the use of a vertical stripping column containing small spheres as packing. The stripping gas, such as hot air or steam, is passed upwardly through the column at a sufficient velocity to impart random motion to the packing. The motion provides a scrubbing action that scours scale from the packing and the internal surfaces of the column.

Other illustrative patents that describe processes for the recovery of ammonia from aqueous streams by distillation after treatment with lime include U.S. Pat. No. 1,012,273 to Pennock et al, U.S. Pat. No. 1,925,799 to Glenn, and U.S. Pat. No. 1,566,796 to Heffner, et al, and U.S. Pat. No. 3,961,027.

U.S. Pat. No. 2,635,073 shows an ammonia recovery method and apparatus having a free still, a fixed still, and a lime leg. The feed stream is introduced into the free still and contacted countercurrently with steam and the vapors from the fixed still. The solution from the bottom of the free still is introduced to the lime leg where it is reacted with a lime slurry to free the fixed ammonia and heated by contact with steam. The hot, limed slurry is introduced to the fixed still wherein the now free ammonia is steam stripped from the slurry. The ammonia rich vapors from the fixed still are introduced into the free still and contacted countercurrently with the feed stream. This patent does not show the contacting of vapors from the fixed still with the limed slurry in the lime leg.

SUMMARY OF THE INVENTION

The present invention provides a method for recovering ammonia from aqueous streams containing fixed ammonia in the form of dissolved ammonium compounds such as ammonium fluoride, ammonium sulfate, and ammonium carbonate. In practice of the invention, an aqueous stream containing fixed ammonia is mixed with a lime slurry in a mixing zone to form a liquid mixture containing free ammonia in solution. The liquid mixture is contacted with the vapor stream containing free ammonia and steam from the stripping zone mentioned below to produce a heated liquid mixture and an ammonia-rich product vapor. Ammonia-rich product vapor is withdrawn from the mixing zone and condensed or otherwise treated for recovery of ammonia. A portion of the heated liquid mixture is withdrawn from the mixing zone and contacted with steam in a stripping zone, such as a packed column. A liquid waste stream stripped of ammonia is withdrawn from the stripping zone. A vapor stream containing free ammonia and steam is withdrawn from the stripping zone and used to heat the liquid mixture as recited above.

The invention provides two advantages. First, when the heated mixture, which is preferably at least about 95° C., is introduced into the stripping zone, little or no scaling occurs because the mixture experiences only a slight increase in temperature in the stripping zone. Second, because the vapors containing ammonia and steam from the stripping zone are contacted with the mixture of lime slurry and aqueous feed to produce the ammonia-rich procuct vapor in the mixing zone, the composition of the product vapor can be controlled by regulating conditions such as temperature, pressure, and residence time in the mixing zone independently of conditions in the stripping zone, thereby allowing the stripping zone to be regulated for high stripping efficiency without the danger of excessively diluting the ammonia-rich product vapor with steam.

BRIEF DESCRIPTION OF THE DRAWING

The sole FIGURE is a schematic illustration of an embodiment of this invention.

DETAILED DESCRIPTION OF THE INVENTION

Referring to the drawing, an overall schematic of one embodiment of the invention is illustrated. A mixing tank 10 contains a heated liquid mixture or slurry 12. The mixture 12 comprises lime slurry continuously introduced through a line 14 and an aqueous feed stream containing an ammonium compound capable of reacting with lime to produce free ammonia in solution, which is continuously introduced through a line 16. The mixing tank 10 has a vapor space 18 containing an ammonia-rich product vapor, and the aqueous feed stream is preferably introduced as a finely divided spray for contacting the feed stream with the product vapor so that free ammonia in the feed can pass into the product vapor.

The aqueous feed stream may be any stream containing fixed ammonia, i.e., ammonia present as one or more dissolved ammonium compounds that do not dissociate under steam stripping conditions to give free ammonia, but which can react with lime to produce free ammonia in solution. The stream may also include free ammonia. The ammonium compounds and free ammonia may be present in the feed stream in any substantial concentration, i.e., more than a trace, up to the limit of solubility. Suspended, undissolved ammonium compounds may also be present.

One such aqueous feed stream is obtained as a waste stream from a uranium recovery process in which $UF_6$ is dissolved in water and reacted with an excess of aqueous ammonia solution to form a precipitate of ammonium diuranate (ADU) as described in U.S. Pat. No. 3,961,027, which is incorporated herein by this reference. After precipitation of the ADU, an aqueous waste containing up to about 15 weight percent of ammonium fluoride and dissolved free ammonia or ammonium hydroxide remains. For simplicity, the remainder of the process will be described with reference to such a waste stream. It should be understood that other streams containing fixed ammonia can also be treated in accordance with this invention.

The rate of addition of the lime slurry, which may contain, for example, from about 2 to 20 parts of lime per 100 parts of water, is regulated to maintain a high alkaline pH in the mixing tank, preferably sufficient to effect reaction of substantially all of the ammonium compound present A pump 20 circulates a side stream of the mixture or slurry 12 through a pH monitor 22 which controls a regulator 50 controlling the rate of addition of the lime slurry. Circulation of the mixture maintains the lime solids in suspension. When the aqueous feed contains ammonium fluoride, the slurry also contains precipitated calcium fluoride which is kept in suspension by circulation of the slurry through the pump 20. The slurry 12 includes suspended lime; suspended calcium salt such as calcium fluoride formed by reaction of the lime with the ammonium compound; dissolved free ammonia; and minor concentrations of dissolved calcium compounds such as lime and calcium fluoride.

The pump 20 also circulates a recycle stream of the heated slurry 12 through line 24 and venturi mixer 26, and pumps another portion of slurry 12 through line 28 to the stripping zone 30. The stripping zone 30 is preferably a packed column for high stripping efficiency.

In the stripping column 30, the heated slurry is contacted countercurrently with steam that is introduced through an inlet 32. Free ammonia is distilled from the slurry and a vapor containing ammonia and steam passes from an outlet 34 to the venturi mixer 26. The liquid phase is substantially stripped of free ammonia, containing as little as about 100 parts per million, and contains suspended and dissolved lime and calcium fluoride. This liquid is withdrawn from the stripping column through an outlet 48, and may be further treated for recovery of calcium compounds.

In the venturi mixer 26, the vapor from the stripping column 30 is intimately contacted with the heated slurry recycle stream flowing through the line 24. The resulting liquid and vapor flow into the mixing tank 10. The vapor is partially condensed, thereby heating the slurry 12, and the vapor picks up additional free ammonia from the slurry 12. Additional steam is supplied to the venturi mixer through an inlet 36 in an amount sufficient for maintaining the body of the slurry 12 in the mixing tank at the desired temperature, preferably at least about 95° C. The liquid-vapor contact in the venturi mixture is desirably sufficiently intimate so that the slurry 12 and the vapor in the vapor space 18 are substantially in chemical and thermal equilibrium.

The temperature of the slurry 12 in the mixing tank 10 is maintained as high as possible, preferably at least about 95° C., for two reasons. First, the solubility of calcium compounds can be inversely related to temperature, so that such a compound can precipitate when the temperature of a solution thereof is increased. Thus, when heated slurry is introduced to the steam stripping column 30, the temperature of the slurry increases only slightly, and there is little tendency for dissolved calcium compounds to come out of solution in the stripping column and cause scaling. Solids such as lime and calcium fluoride that are ready in suspension in the heated slurry do not adhere tightly to the packing or inside surfaces of the stripping column and thus do not contribute significantly to scaling. Second, the ammonia content of the product vapor in vapor space 18 is greater at the higher temperatures because the solubility of ammonia in the slurry decreases as the temperature is increased.

Ammonia-rich product vapor is withdrawn from the vapor space 18 through a line 40. A baffle 38 in the vapor space helps to limit the amount of mist withdrawn with the product vapor. The product vapor is passed through a heat exchanger 42 wherein heat is transferred from the product vapor to the aqueous feed stream, which is introduced to the heat exchanger through an inlet 44 and is withdrawn through the line 16. The cooled product vapor is withdrawn from the heat exchanger through an outlet 46, along with any condensate that may have formed in the heat exchanger. The product vapor may be treated in any conventional way for recovery of ammonia therefrom. For example, the vapor may be fully condensed to form an aqueous solution of ammonia of useful concentration.

Although the present invention has been described with reference to a particular embodiment thereof, other embodiments within the scope of the invention will be evident to those skilled in the art. For example, the vapor from the stripping column can be sparged directly into the slurry in the mixing tank to heat and to agitate the slurry, and the aqueous feed can be introduced below the liquid level of the slurry. Thus, the particulars of the description are intended to illustrate the invention, the scope of which is defined in the following claims:

What is claimed is:

1. A method of recovering ammonia from a continuously circulating aqueous stream containing an ammonium compound capable of reacting with lime to form free ammonia in solution, which consists essentially of the steps of:
  (a) mixing the continuously circulating aqueous stream with a lime slurry solution in a mixing zone to form a mixture containing free ammonia in solution and continuing the circulating of the mixture to maintain solids thereof in suspension;

(b) heating the mixture while circulating by contact with a steam-containing gas to form a liquid mixture heated to a temperature of at least about 95° C. and an ammonia-rich product vapor;

(c) continuously withdrawing heated liquid mixture from the mixing zone and continuously contacting the withdrawn mixture with steam in a stripping zone to form liquid waste and vapor containing free ammonia and steam;

(d) continuously withdrawing vapor containing free ammonia and steam from the stripping zone and using said vapor as at least a portion of the steam-containing gas in step (b); and (e) continuously withdrawing ammonia-rich product vapor from the mixing zone.

2. The method of claim 1 which comprises the step of contacting the aqueous stream with the ammonia-rich product vapor before mixing the aqueous stream with the lime slurry solution.

3. The method of claim 1 wherein the aqueous stream contains an ammonium compound selected from the group consisting of ammonium fluoride, ammonium sulfate and ammonium carbonate.

4. The method of claim 1 wherein the lime slurry is added in at least about the stoichiometric proportion for reacting with the ammonium compound in the aqueous stream.

5. The method of claim 1 wherein the stripping zone is a packed column.

6. The method of claim 1 comprising the step of equilibrating the ammonia-rich product vapor with the heated liquid mixture in the mixing zone.

7. The method of claim 1 comprising the step of condensing ammonia-rich product vapor withdrawn from the mixing zone.

8. A method of recovering ammonia from a continuously circulating aqueous stream containing an ammonium compound capable of reacting with lime to form free ammonia in solution, which consists essentially of the steps of:

(a) contacting the continuously circulating aqueous stream with a lime slurry to form a mixture containing free ammonia in solution and continuing the circulating of the mixture to maintain solids thereof in suspension;

(b) contacting the mixture of step (a) while continuously circulating with the vapor stream from step (c) and steam to form a heated liquid mixture and an ammonia-rich product vapor, (c) contacting a portion of the continuously circulating heated liquid mixture from step (b) with steam in a stripping zone to form a liquid waste stream and a vapor stream containing free ammonia and steam; and (d) recovering ammonia-rich product vapor.

9. The method of claim 8 wherein the aqueous stream contains an ammonium compound selected from the group consisting of ammonium fluoride, ammonium sulfate, and ammonium carbonate.

10. The method of claim 8 wherein the lime slurry is added in at least about the stoichiometric proportion for reacting with the ammonium compound in the aqueous stream.

11. The method of claim 8 wherein the stripping zone is a packed column.

12. The method of claim 8 wherein the liquid mixture is heated to a temperature of at least about 95° C.

13. The method of claim 8 which comprises the step of equilibrating the ammonia-rich product vapor with the heated liquid mixture.

14. A continuous method for recovering ammonia from a continuously circulating aqueous stream containing an ammonium compound capable of reacting with lime to form free ammonia in solution, which consists essentially of the steps of:

(a) establishing a circulating liquid mixture heated to a temperature of at least about 95° C. in a mixing zone, the circulating mixture comprising an ammonium compound capable of reacting with lime to form free ammonia in solution and lime in a proportion sufficient for reacting with at least a portion of said ammonium compound and continuing the circulating of the mixture to maintain solids thereof in suspension;

(b) continuously introducing into the mixing zone a lime slurry stream and an aqueous stream containing said ammonium compound;

(c) continuously withdrawing a stream of heated liquid mixture from the mixing zone and continuously introducing the stream into a steam stripping zone to produce vapor containing ammonia and steam and a waste liquid stripped of ammonia;

(d) continuously withdrawing a recycle stream of heated liquid mixture from the mixing zone, contacting the recycle stream with steam and the vapor from the stripping zone, and introducing the resulting liquid and vapor into the mixing zone, whereby the liquid mixture in the mixing zone is heated and an ammonia-rich product vapor is produced; and (e) continuously withdrawing ammonia-rich product vapor from the mixing zone.

15. The method of claim 14 wherein the aqueous stream contains an ammonium compound selected from the group consisting of ammonium fluoride, ammonium sulfate, and ammonium carbonate.

16. The method of claim 14 wherein the lime slurry is introduced in at least about the stoichiometric proportion for reacting with the ammonium compound in the aqueous stream.

17. The method of claim 14 wherein the stripping zone is a packed column.

18. The method of claim 14 which comprises the step of equilibrating the ammonia-rich product vapor with the heated liquid mixture.

19. The method of claim 8 or 1 or 14 wherein during the step of contacting the mixture of step (a) with the vapor stream and steam, the mixture and vapor stream are intimately mixed for a time sufficient for establishing a thermal equilibrium between the mixture and vapor stream and equilibrium between the ammonia in the vapor stream and ammonia in the mixture.

20. The methd of claim 8 or 1 or 14 wherein the contacting of the mixture with the vapor stream and steam heats the liquid mixture to a temperature sufficient for preventing scaling in the stripping zone.

21. The method of claim 8 or 1 or 14 wherein the contacting of the mixture with the vapor stream and steam heats the liquid mixture to a temperature for providing upon introducing the liquid mixture to the stripping zone, a sufficiently small temperature differential between the liquid mixture and the stripping zone for preventing scaling within the stripping zone.

* * * * *